United States Patent Office 2,817,151
Patented Dec. 24, 1957

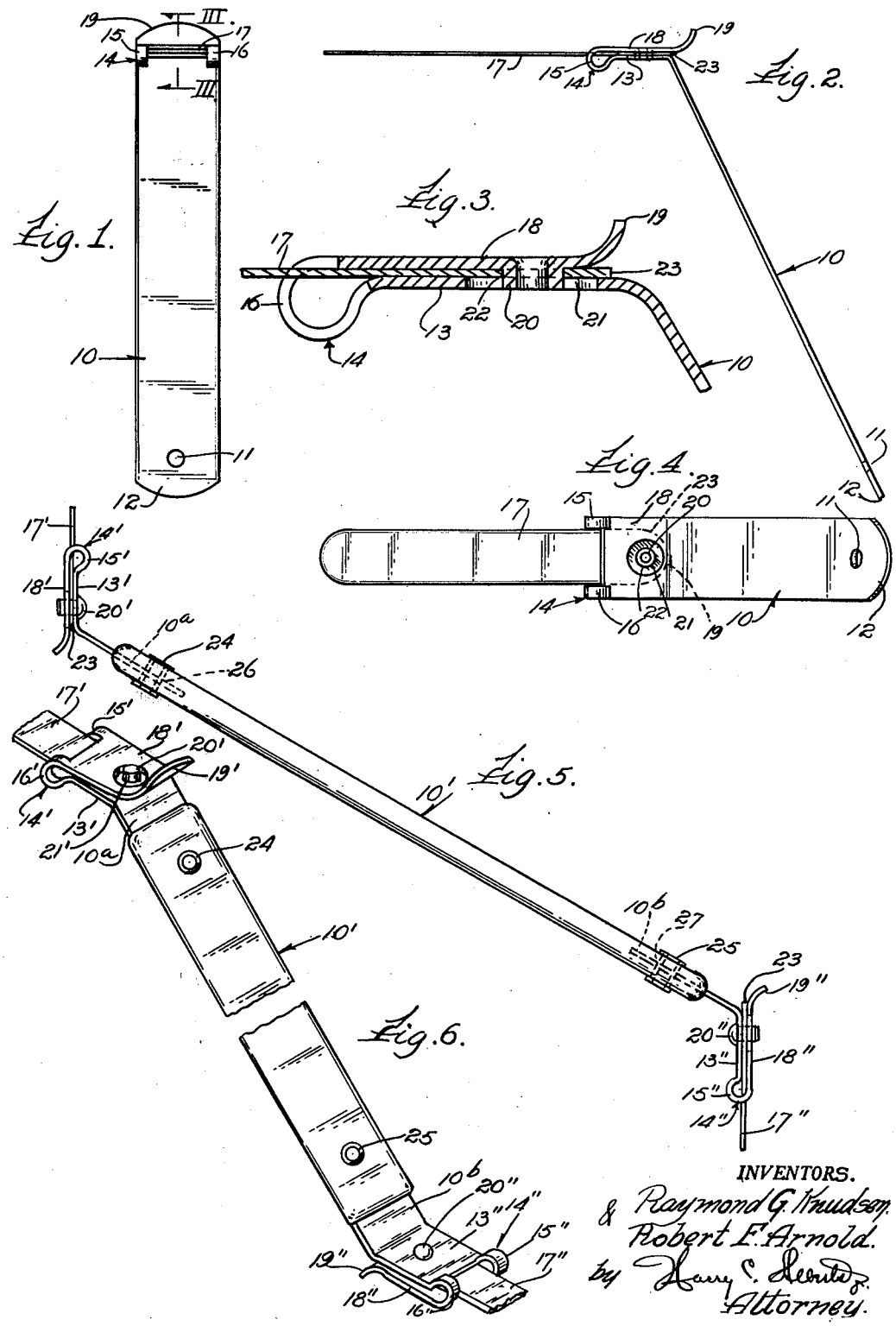

2,817,151
TAPPET OR VALVE LASH GAUGE HOLDER

Raymond G. Knudsen and Robert F. Arnold, Kenosha, Wis., assignors to Snap-On Tools Corporation, Kenosha, Wis., a corporation of Delaware Application March 23, 1954, Serial No. 417,990

8 Claims. (Cl. 33—168)

This invention relates to feeler gauges and more particularly to tappet or valve lash gauge holders, although certain features thereof may be employed with equal advantage for other purposes.

It contemplates more especially the provision of a simple and effective spring urged retainer in conjunction with a handle member for holding feeler gauges in position, and to enable the substitution of gauges of different thicknesses without enabling any appreciable time or labor.

Flat plate feeler gauges of predetermined thicknesses have long been used for determining the lash or play between cooperating parts of different mechanisms, and particularly in connection with valve tappet adjustments where precision is required and a predetermined valve lash maintained. In modern internal combustion engines, the valves are so closed to the exhaust manifolds and other parts of the engines that are usually subjected to high temperatures so that feeler gauges should be remotely supported to avoid burns and injury to the attendant. With this in view, a simple and effective handle member has been provided with a flat spring urged retaining expedient that will effectively retain feeler gauges in position relative to the handle member and permit the ready substitution or removal of the feeler gauges depending on any particular requirements.

One object of the present invention is to simplify the construction and improve the effectiveness of flat gauge holders.

Another object is to provide a flat feeler gauge holder involving a flat spring retainer which is complemental to the feeler gauge for ready insertion and removal without resort to any tools or other extraneous expedients.

Still another object is to provide a spring urged blade retainer embodying a projection complementary to an aperture in the feeler gauge to permit the ready insertion and removal.

A further object is to provide a simple and effective flat spring type blade retainer in conjunction with a handle member for holding detachably associated feeler gauges in rigid relation to the holder.

A still further object is to provide a flat spring-type feeler gauge holder embodying a simple finger manipulating expedient in conjunction with a projecting retainer complementary to an aperture in the feeler gauge plate.

Other objects and advantages will appear from the following description of an illustrated embodiment of the present invention.

In the drawings:

Figure 1 is a plan view of a feeler gauge holder embodying features of the present invention.

Figure 2 is a side edge view in elevation of the feeler gauge and holder shown in Figure 1.

Figure 3 is an enlarged fragmentary sectional view taken substantially along line III—III of Figure 1.

Figure 4 is a bottom plan view of the feeler gauge and holder.

Figure 5 is an edge view in elevation of a modified feeler gauge holder having provision for holding feeler gauges at both ends.

Figure 6 is a perspective view of the feeler gauge shown in Figure 5.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a substantially rectangular flat handle member 10 stamped or otherwise shaped from rigid sheet steel or the like to provide an elongated manually grasping handle preferably though not essentially having an aperture 11 proximate to the inoperative rounded end 12 of the handle member 10. The aperture 11 in the handle member 10 enables it to be supported from a nail or other wall retainer when not in use.

The elongated rectangular handle member 10 terminates at its other end in an angularly offset flat rectangular shank 13 formed integral therewith to constitute part of a feeler gauge holder to be presently described. The holder shank 13 extends outwardly in an enlarged arcuately curved extremity 14 which is furcated to provide spaced ears 15—16 between which a flat feeler plate gauge 17 is insertable for detachable association. The flat feeler plate gauge 17 is insertable for contact with and retention against the holder shank 13 by resort to a confronting spring urged plate 18 that substantially conforms in width and length to the holder shank 13 serving as a plate conforming to and confronting the plate 18. As shown, the retainer plate 18 extends integrally from the enlarged arcuate and furcated extremity 14 to lie flat and to be normally spring urged against the holder shank 13 by means of the arcuate furcated extremity 14 with its ears 15—16 that provide a flat spring-type urge and contact between the confronting flat shank 13 and the correspondingly shaped and sized retainer plate 18.

As shown, the retainer plate 18 extends rearwardly toward the handle member 10 and terminates in an upturned extremity 19 serving as a curved finger manipulating extension that facilitates the finger springing of the retainer plate 18 for displacement from the flat shank 13 against the spring urge provided in the retainer plate 18 by the reversely bent arcuate extremity 14. To the end of providing for the secure retention of the flat feeler plate gauge 17 between the arcuate spaced ears 15—16 that guide the edges of the feeler plate gauge 17 therebetween, the retainer plate 18 is preferably provided with a tubular rivet-type projection 20 that extends through an enlarged confronting opening 21 in the flat shank 13 for a distance substantially commensurate with the thickness of the flat shank 13.

The tubular rivet-type projection 20 is preferably stamped into the retainer plate 18 proximate to the curved extremity 19 thereof to register with a slightly larger aperture 22 provided in the inoperative end regions 23 of the elongated feeler plate gauge 17 for retention between the handle shank 13 and the retainer plate 18 by spring urged friction and mechanical retention through the connection of the rivet-type projection 20 with the aperture 22 provided in the feeler plate gauge 17 designed for use with this particular holder structure.

With this arrangement and structural expedients, the feeler gauge plate 17 is readily inserted between the spaced ears 15—16 and the confronting shank and plate 13—18 until registry is effected by the rivet-type projection 20 and engages the aperture 22 in the end region 23 of the feeler gauge plate 17. During the insertion and removal of the feeler plate gauge 17, it is necessary only to finger press the curved projecting extremity 19 of the retainer plate 18 for limited deflection or displacement from the handle shank 13, and this will enable the ready engagement or disengagement of the feeler plate gauge 17 of any particular precision thickness usually identified thereon by measurement indicia. It should be noted that with this arrangement, the handle 10 could be accidentally or otherwise flexed in the direction of the retainer plate 18 and even result in the slight deflection thereof without disconnecting the feeler plate gauge 17 therefrom because the latter would follow the displacement of the rivet-type projection 20 and thus would still be held in secure retention by the confronting shank and plate holder 13—18.

In the modified embodiment illustrated in Figures 5 and 6, feeler gauges 17'—17" of different precision thicknesses are held at each end of an elongated handle member such as a plastic bar 10' by means of spring impelled confronting shank and plate holders 13'—18' and 13"—18" which conform in every detail to the confronting shank and plate holder 13—18 described in the first embodiment hereof, and are joined with the elongated rectangular handle member 10 by means of suitable fasteners such as rivets 24—25 that extend through the handle member 10' and an offset handle shank portion 10a—10b. The handle shank portions 10a—10b of the confronting shank and plate holders 13'—18' and 13"—18" fit into slits in the end of the bar type handle member 10' so that the rivets 24—25 will extend therethrough and register with apertures 26—27 provided in the handle shank portions 10a—10b of the confronting shank and plate holders 13'—18' and 13"—18". In all other details the holders 13'—18' and 13"—18" are identical to the construction described above save for the retainer projections 20'—21' which, in this instance, may comprise solid rivets that are pressed through somewhat smaller apertures in the holder shanks 13' and 13". This expedient may be preferable or an equivalent substitute for the tubular rivet-type projection 20 in the first described embodiment, depending upon the dictates of commercial practice.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. A holder for feeler gauges and the like comprising an elongated handle member, a reversely bent shank extending from said handle member to define confronting plates in spring urged contact with each other, there being spaced furcations in the reversely bent edge connecting said confronting plates to frictionally receive a feeler gauge therebetween, and means on said confronting plates complemental to the feeler gauge to detachably retain the feeler gauge between said confronting plates responsive to the spring urged contact of said confronting plates with a feeler gauge therebetween.

2. A holder for feeler gauges and the like comprising an elongated handle member, a reversely bent shank extending from said handle member to define confronting plates in spring urged contact with each other, there being spaced furcations in the reversely bent edge connecting said confronting plates to frictionally receive a feeler gauge therebetween, and means including a projecting retainer member on said confronting plates complemental to a hole in the feeler gauge to detachably retain the feeler gauge between said confronting plates responsive to the spring urged contact of said confronting plates with a feeler gauge therebetween.

3. A holder for feeler gauges and the like comprising an elongated handle member, a reversely bent shank extending from said handle member to define confronting plates in spring urged contact with each other, there being spaced furcations in the reversely bent edge connecting said confronting plates to frictionally receive a feeler gauge therebetween, a curved end on the free spring urged confronting plate to enable the manipulation thereof for spacing against the spring urge therein, and means including a projecting retainer member on said confronting plates complemental to a hole in the feeler gauge between said confronting plates responsive to the spring urged contact of said confronting plates with a feeler gauge therebetween.

4. A holder for feeler gauges and the like comprising an elongated handle member, a reversely bent shank offset from said handle member to define confronting plates in spring urged contact with each other, there being spaced furcations in the reversely bent edge connecting said confronting plates to frictionally receive a feeler gauge therebetween, a curved end on the free spring urged confronting plate to enable the manipulation thereof for spacing against the spring urge therein, and means including a projecting retainer member on said confronting plates complemental to a hole in the feeler gauge between said confronting plates to detachably retain the feeler gauge between said confronting plates responsive to the spring urged contact therebetween.

5. A feeler gauge clamp comprising spaced confronting plates in reversely bent integral connection to frictionally receive a feeler gauge plate therebetween, and feeler gauge engaging means on one of said plates to project freely through a hole in the other of said plates, said engaging means being complemental to a feeler gauge disposed between said confronting plates to mechanically retain the feeler gauge in operative position responsive to the spring urged contact of said confronting plates with a feeler gauge therebetween.

6. A feeler gauge clamp comprising spaced confronting plates in reversely bent integral connection to frictionally receive a feeler gauge plate therebetween, feeler gauge engaging means on one of said plates to project freely through a hole in the other of said plates, said engaging means being complemental to a feeler gauge disposed between said confronting plates to mechanically retain the feeler gauge in operative position responsive to the spring urged contact of said confronting plates with the feeler gauge therebetween, and a flat offset handle member formed integral with one of said confronting plate members.

7. A feeler gauge clamp comprising spaced confronting plates in reversely bent integral connection to frictionally receive a feeler gauge plate therebetween, feeler gauge engaging means on one of said plates to project freely through a hole in the other of said plates, said engaging means being complemental to a feeler gauge disposed between said confronting plates to mechanically retain the feeler gauge in operative position responsive to the spring urged contact of said confronting plates with the feeler gauge therebetween, a flat offset handle member formed integral with one of said confronting plate members, and a curved finger manipulating extension on the free end of the other of said confronting plate members to release the feeler gauge disposed between said confronting plates.

8. A feeler gauge clamp comprising spaced confronting plates in reversely bent integral connection to frictionally receive a feeler gauge plate therebetween, feeler gauge engaging means extending from one of said plates to project freely through a hole in the other of said plates, said engaging means being complemental to a feeler gauge disposed between said confronting plates to mechanically retain the feeler gauge in operative position responsive to the spring urged contact of said confronting plates with a feeler gauge therebetween, a flat offset handle member formed integral with one of said confronting plate members, and a curved finger manipulating extension on the free end of the other of said confronting plate members to release the feeler gauge disposed between said confronting plates.

References Cited in the file of this patent

UNITED STATES PATENTS

| | | |
|---|---|---|
| 1,157,214 | Genin | Oct. 19, 1915 |
| 1,649,259 | Schmitz | Nov. 15, 1927 |
| 2,498,171 | Michler | Feb. 21, 1950 |
| 2,682,110 | Muiza | June 29, 1954 |